(12) United States Patent
Taylor et al.

(10) Patent No.: US 9,939,151 B2
(45) Date of Patent: Apr. 10, 2018

(54) OXYGEN-FUEL BURNER WITH STAGED OXYGEN SUPPLY

(71) Applicant: HONEYWELL INTERNATIONAL INC., Morristown, NJ (US)

(72) Inventors: Curtis L. Taylor, Gaston, IN (US); Brad Patterson, Dunkirk, IN (US); Marek Scholler, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 352 days.

(21) Appl. No.: 14/775,720

(22) PCT Filed: Mar. 15, 2013

(86) PCT No.: PCT/US2013/032198
§ 371 (c)(1),
(2) Date: Sep. 13, 2015

(87) PCT Pub. No.: WO2014/142988
PCT Pub. Date: Sep. 18, 2014

(65) Prior Publication Data
US 2016/0025334 A1    Jan. 28, 2016

(51) Int. Cl.
| F23D 14/32 | (2006.01) |
| F23C 6/04 | (2006.01) |
| F23C 7/02 | (2006.01) |
| F23M 5/02 | (2006.01) |
| F23D 14/56 | (2006.01) |
(Continued)

(52) U.S. Cl.
CPC .............. *F23D 14/32* (2013.01); *F23C 6/04* (2013.01); *F23C 7/02* (2013.01); *F23D 14/56* (2013.01); *F23L 5/02* (2013.01); *F23L 7/007* (2013.01); *F23M 5/025* (2013.01)

(58) Field of Classification Search
USPC .................................. 431/188, 181, 90, 350
See application file for complete search history.

(56) References Cited

U.S. PATENT DOCUMENTS

| 3,071,182 A | * | 1/1963 | Steinmetz ............... F23C 99/00 |
| | | | 431/266 |
| 3,463,602 A | * | 8/1969 | Bitterlich ................ F23D 14/22 |
| | | | 431/188 |

(Continued)

FOREIGN PATENT DOCUMENTS

| CA | 2302214 C | 11/2004 |
| CN | 1186926 A | 7/1998 |
| EP | 2965002 A | 1/2016 |

OTHER PUBLICATIONS

First Office Action from related China Patent Application No. 201380076603, dated Dec. 23, 2016, 20 pages.
(Continued)

*Primary Examiner* — Avinash Savani

(57) ABSTRACT

A nozzle in a burner assembly is configured to produce a flame. The nozzle is configured to include a fuel-discharge outlet and to conduct fuel along a path in the nozzle to the fuel-discharge outlet. Pressurized primary oxygen is provided to mix with fuel discharged by the nozzle to produce a mixture that can be ignited to produce a flame. Staged oxygen is provided to the flame in a region downstream from the nozzle.

18 Claims, 7 Drawing Sheets

(51) Int. Cl.
*F23L 5/02* (2006.01)
*F23L 7/00* (2006.01)

(56) References Cited

U.S. PATENT DOCUMENTS

| | | | |
|---|---|---|---|
| 4,004,875 A * | 1/1977 | Zink | F23C 7/00 |
| | | | 431/116 |
| 4,496,306 A | 1/1985 | Okigami et al. | |
| 4,568,268 A * | 2/1986 | Gerlach | F23D 14/60 |
| | | | 431/90 |
| 5,431,559 A | 7/1995 | Taylor | |
| 5,458,483 A | 10/1995 | Taylor | |
| 5,899,076 A | 5/1999 | Snyder et al. | |
| 2004/0157178 A1* | 8/2004 | Dugue | F23C 6/045 |
| | | | 431/10 |
| 2004/0261671 A1 | 12/2004 | Taylor | |
| 2005/0132941 A1 | 7/2005 | Taylor | |

OTHER PUBLICATIONS

International Search Report and Written Opinion from related PCT Application PCT/US2013/032198 dated Jun. 10, 2013, 10 pp.
Extended Search Report from related European Patent Application 13877622, dated Oct. 4, 2016, 9 pp.

* cited by examiner

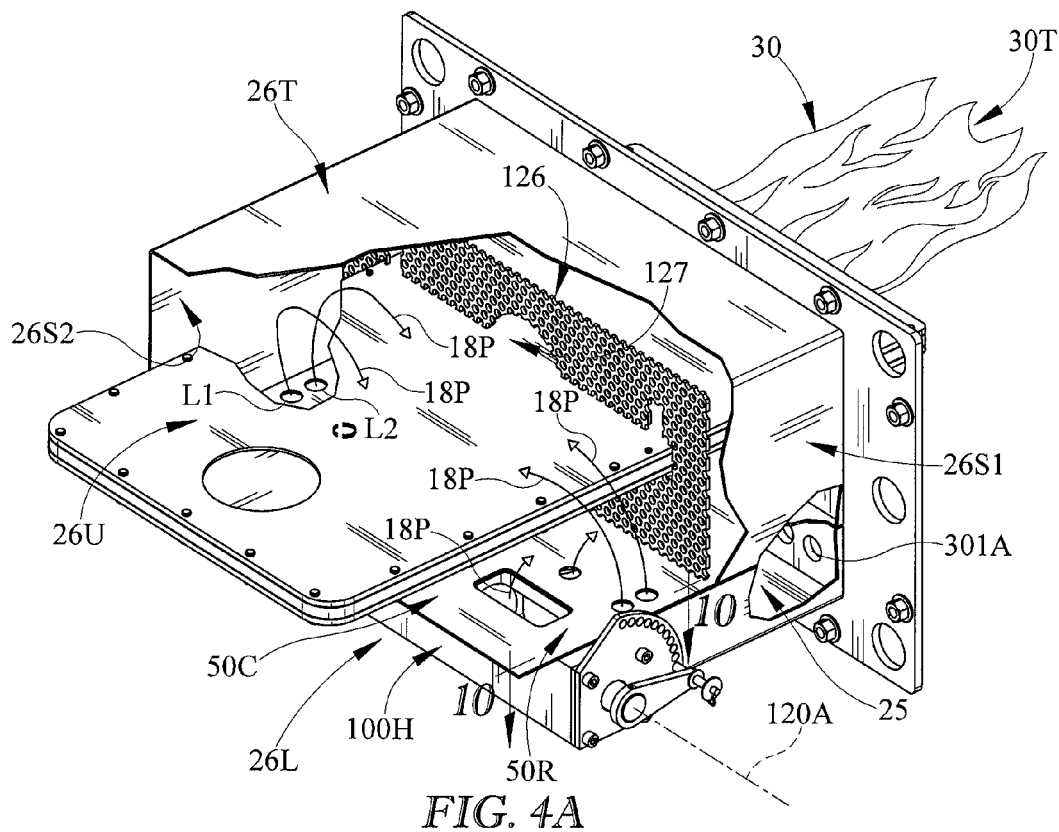
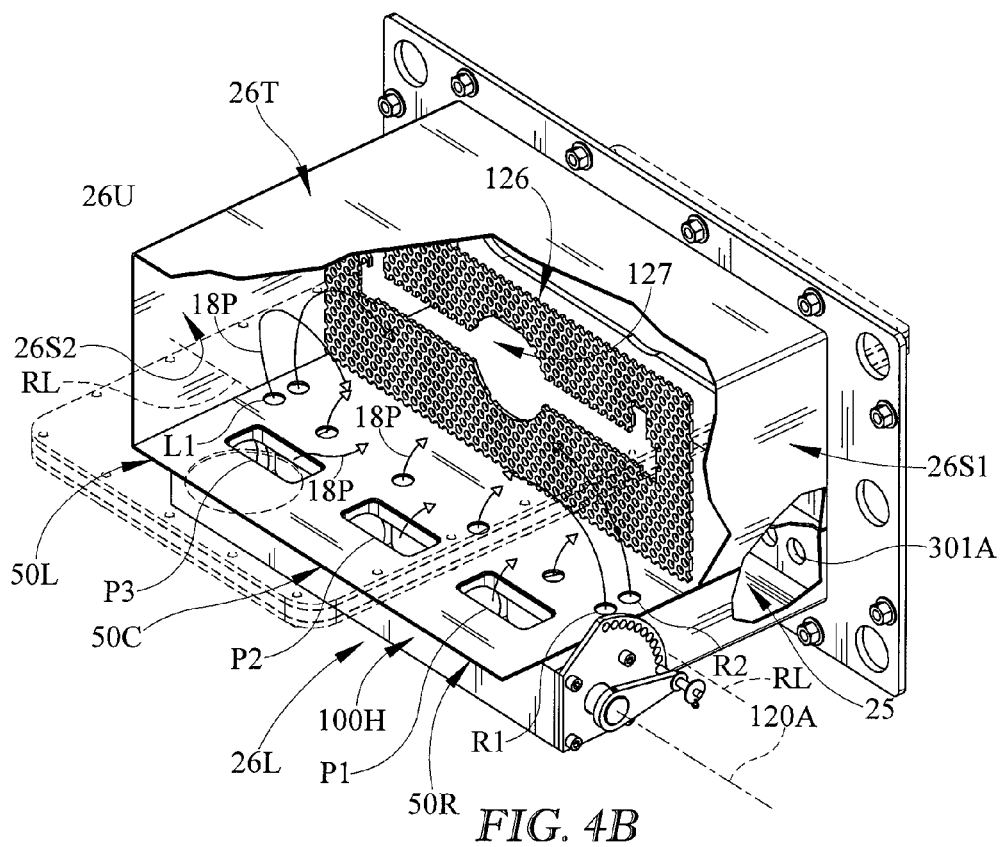

OXYGEN-FUEL BURNER WITH STAGED OXYGEN SUPPLY

BACKGROUND

The present disclosure relates to burner assemblies, and particularly to oxygen-fuel burner assemblies. More particularly, the present disclosure relates to a burner having a fuel-delivery system and a staged oxygen-supply system.

SUMMARY

A burner apparatus is provided for combining oxygen and fuel to produce a flame. In illustrative embodiments, the burner apparatus includes a burner block formed to include an oxygen-flow passageway communicating with a downstream flame chamber and a fuel-discharge nozzle arranged to extend through the oxygen-flow passageway and configured to discharge fuel into the flame chamber.

In illustrative embodiments, the burner apparatus includes an oxygen-delivery system comprising an oxygen-receiving plenum, a primary oxygen-supply housing and a staged oxygen supply conduit. The oxygen-receiving plenum is adapted to receive pressurized oxygen from an oxygen source and supply a constant flow of pressurized primary oxygen to the primary oxygen-supply housing and also supply a constant flow of pressurized staged oxygen to the staged oxygen-supply conduit. The fuel-discharge nozzle is arranged to extend through the primary oxygen-supply housing and the oxygen-flow passageway in a direction toward the flame chamber.

Primary oxygen flows under pressure from a primary-oxygen chamber provided in the primary oxygen-supply housing into the flame chamber through the oxygen-flow passageway and around the fuel-discharge nozzle to mix with fuel discharged from the nozzle to produce a combustible oxygen-fuel mixture in an upstream first-stage combustion zone in illustrative embodiments of the present disclosure. This mixture is ignited to produce a flame. The first-stage combustion zone is located in the flame chamber away from the primary oxygen-supply housing and near the root of the flame.

Staged oxygen flows under pressure from the oxygen-receiving plenum through a staged oxygen supply conduit formed in the burner block and separated from the flame chamber into a flame-receiving channel provided in the burner apparatus and coupled to an outlet opening of the flame chamber to provide a stream of staged oxygen to a second-stage combustion zone located in the flame-receiving channel nearer to the tip of the flame. By causing some of the combustion oxygen to flow as staged oxygen through the staged oxygen conduit toward the tip of the flame, it is possible to reduce nitrogen oxide emissions and increase radiative heat transfer.

In illustrative embodiments, the oxygen-receiving plenum is located adjacent to the primary oxygen-supply housing and to the staged-oxygen supply conduit formed in the burner block. Oxygen flows under pressure from an oxygen source into the oxygen-receiving plenum.

Some of the pressurized oxygen in the oxygen-receiving plenum flows as primary oxygen from the oxygen-receiving plenum into the primary-oxygen chamber of the primary oxygen-supply housing through several constant-flow oxygen-inlet orifices communicating with the primary-oxygen chamber and with the oxygen-receiving plenum. In this way at least a minimum level of pressurized primary oxygen is maintained in the primary-oxygen chamber formed in the primary oxygen-supply housing. These constant-flow oxygen-inlet orifices are round and formed in a boundary wall located between the primary-oxygen chamber and the oxygen-receiving plenum in an illustrative embodiment.

Some of the pressurized oxygen in the oxygen-receiving plenum flows as staged oxygen from the oxygen-receiving plenum through constant-flow staged-oxygen apertures opening into a staged oxygen conduit formed in the burner block. The staged oxygen conduit is arranged to connect the oxygen-receiving plenum in fluid communication with the flame-receiving channel lying downstream of the burner block and providing the second-stage combustion zone.

A variable oxygen-diversion system in accordance with illustrative embodiments of the present disclosure is provided to enable a system operator to divert a variable amount of additional pressurized oxygen extant in the oxygen-receiving plenum to flow as primary oxygen from the oxygen-receiving plenum into the primary-oxygen chamber of the primary oxygen-supply housing along another route without flowing through the constant-flow oxygen-inlet orifices formed in the common boundary wall separating the primary-oxygen chamber of the primary oxygen-supply housing and the oxygen-receiving plenum. Activating the variable oxygen-diversion system in accordance with the present disclosure to open an oxygen-flow control valve placed in an oxygen-diversion passageway causes more primary oxygen to be delivered to the first-stage combustion zone provided in the flame chamber and proportionally less staged oxygen to be delivered to the second-stage combustion zone provided in the downstream flame-receiving channel. Alternatively, the oxygen-flow control valve can be closed partly or fully to reduce the ratio of primary oxygen to staged oxygen for the burner apparatus.

The variable oxygen-diversion system includes an oxygen-diversion passageway connecting the oxygen-receiving plenum in fluid communication with the oxygen-supply chamber of the primary oxygen-supply housing and a rotatable oxygen-flow control valve arranged to extend into the oxygen-diversion passageway and rotate therein about an axis to vary the flow of pressurized oxygen from the oxygen-receiving plenum through the oxygen-diversion passageway into the primary-oxygen chamber of the primary oxygen-supply housing. In illustrative embodiments, the boundary wall associated with the primary-oxygen chamber is formed to include several rectangular variable-flow oxygen-admission ports that are located upstream of the round constant-flow oxygen-inlet orifices and are arranged to open into and communicate with the oxygen-diversion passageway.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4A is a perspective view of the burner unit of FIGS. 3A and 3B taken from another point of view and now showing a portion of the fuel-discharge nozzle located in the primary-oxygen chamber of the primary oxygen-supply housing and arranged to extend through an opening formed in the oxygen-diffuser screen toward the flame chamber and showing flow of primary oxygen discharged from four of the sideline round downstream constant-flow oxygen-inlet orifices up and over the fuel-discharge nozzle into an upper region of the primary-oxygen chamber provided between the nozzle and a ceiling of the primary oxygen-supply housing;

FIG. 4B is a view similar to FIG. 4A but showing the portion of the fuel-discharge nozzle in phantom to illustrate flow of primary oxygen discharged from four of the centered round constant-flow downstream oxygen-inlet orifices and the three rectangular upstream variable-flow oxygen-admission ports along paths under the fuel-discharge nozzle and through a lower region of the primary-oxygen chamber provided between the nozzle and the floor of the primary oxygen-supply housing toward the flame chamber;

FIG. 9 is a side elevation view showing the valve rotator in a first position;

FIG. 10 is a sectional view showing the oxygen-control valve in a fully opened first position;

FIG. 11 is a side elevation view showing the valve rotator in a second position;

FIG. 12 is a sectional view showing the oxygen-control valve in an almost opened second position rotated through an angle of about 22.5° from the first position;

FIG. 13 is a side elevation view showing the valve rotator in a third position;

FIG. 14 is a sectional view showing the oxygen-control valve in a horizontal third position rotated through an angle of about 45° from the first position;

FIG. 15 is a side elevation view showing the valve rotator in a fourth position;

FIG. 16 is a sectional view showing the oxygen-control valve in a partly closed fourth position rotated through an angle of about 63° from the first position;

FIG. 17 is a side elevation view showing the valve rotator in a fifth position;

FIG. 18 is a sectional view showing the oxygen-control valve in a closed fifth position.

DETAILED DESCRIPTION

Figure 1:
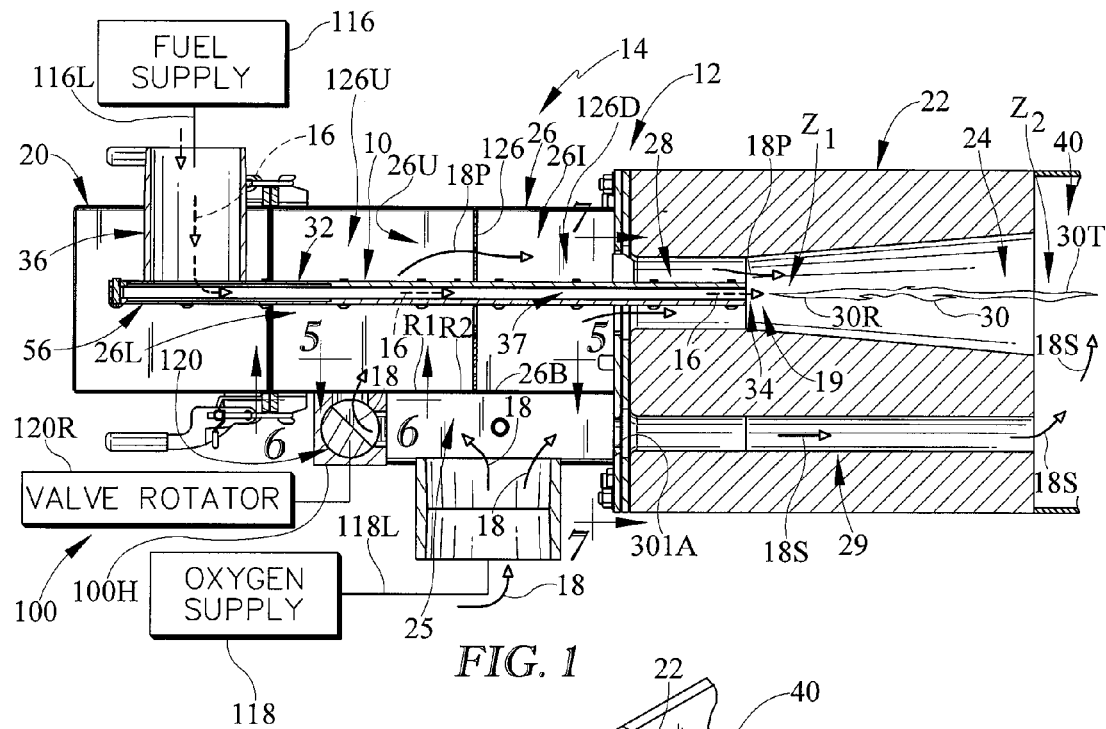
FIG. 1 is a sectional view taken along line 1-1 of FIG. 2 of an oxygen-fuel burner unit showing a first embodiment of a fuel-discharge nozzle configured to conduct fuel and to provide means for generating a flat flame when fuel conducted by the fuel-discharge nozzle is exposed to oxygen to produce a combustible oxygen-fuel mixture that is ignited and showing that the fuel-discharge nozzle is arranged to extend through a primary oxygen-supply housing so that fuel discharged from the fuel-discharge nozzle mixes in a flame chamber formed in a burner block with primary oxygen flowing under pressure from the primary oxygen-supply housing into the flame chamber through an oxygen-flow passageway containing portions of the fuel-discharge nozzle to reach a first-stage combustion zone (Z1) near the root of the flame and showing that a variable oxygen-diversion system is provided on the underside of the primary oxygen-supply housing and that system includes a rotatable oxygen-flow control valve mounted for human operator-controlled rotation in an oxygen-diversion passageway arranged to connect the primary-oxygen chamber in fluid communication with an oxygen-receiving plenum located below the primary-oxygen chamber and configured to vary the supply of primary oxygen provided to mix with fuel discharged from the fuel-discharge nozzle into the flame chamber and proportionally vary the supply of staged oxygen discharged from the oxygen-receiving plenum through a staged oxygen supply conduit to a second-stage combustion zone (Z2) located near the tip of the flame.
Figure 2:
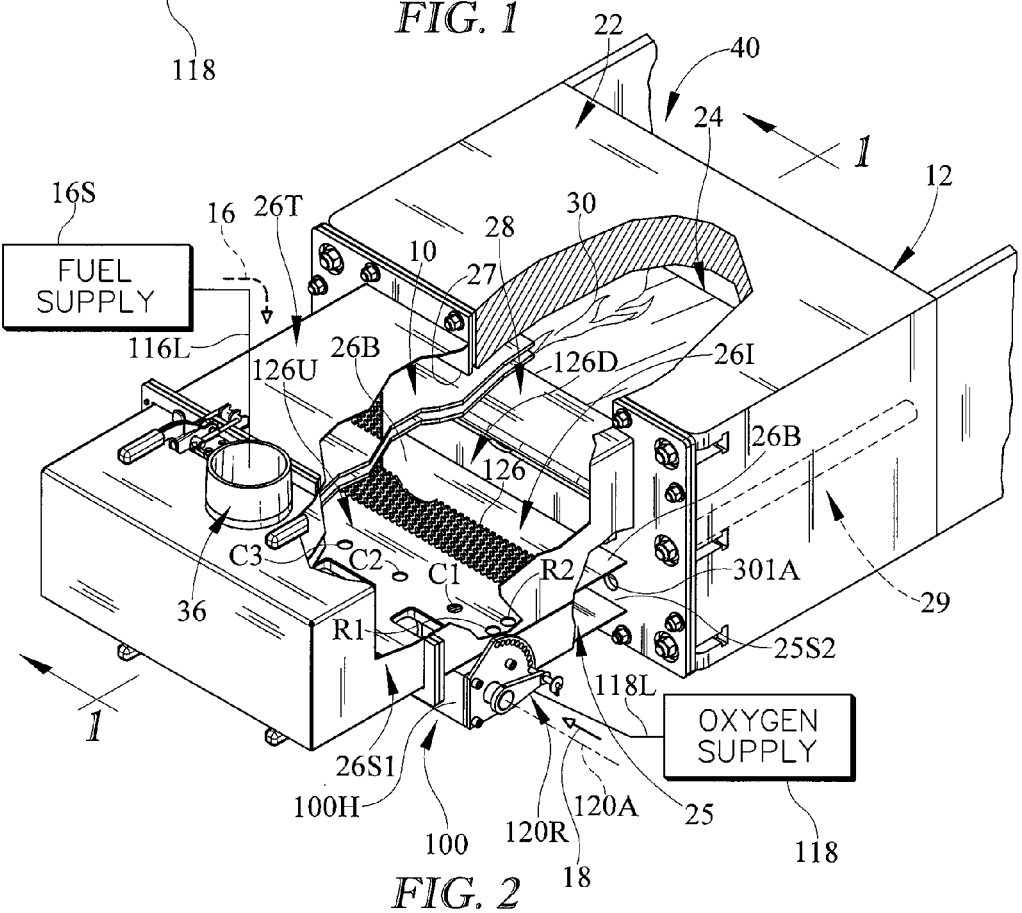
FIG. 2 is a perspective view of the oxygen-fuel burner unit of FIG. 1 with portions broken away to show that the horizontally extending fuel-discharge nozzle is mounted in the primary oxygen-supply housing and arranged to extend through the primary-oxygen chamber and terminate near the mouth of a flame chamber formed in the burner block and showing a valve rotator included in the variable oxygen-diversion system and configured to provide means for rotating the oxygen-flow control valve of FIG. 1 about a horizontal axis of rotation to vary the flow of pressurized oxygen discharged from the oxygen-receiving plenum as primary oxygen into a primary-oxygen chamber formed in the primary oxygen-supply housing.

A fuel-discharge nozzle 10 is included in a burner apparatus 12 of an oxygen-fuel combustion system 14 as suggested in FIGS. 1 and 2. Burner apparatus 12 includes a nozzle-support fixture 20 coupled to a burner block 22 formed to include a flame chamber 24 as suggested in FIGS. 1 and 2. In use, primary oxygen 18P is mixed with fuel 16 discharged by fuel-discharge nozzle 10 to produce a combustible mixture 19 that is ignited to produce a flame 30 as suggested in FIG. 1. Staged oxygen 18S is supplied to a tip 30T of flame 30 to mix with any uncombusted fuel 16 to complete combustion. A field-adjustable oxygen controller 100 is provided in accordance with the present disclosure to allow a human operator in the field to vary the ratio of primary oxygen 18P to staged oxygen 18S without substitution of components included in burner apparatus 12.

Fuel-discharge nozzle 10 is mounted on nozzle-support structure 20 as suggested in FIG. 1 and arranged to extend into flame chamber 24. Fuel-discharge nozzle 10 is configured to produce a flat flame in an illustrative embodiment as suggested in FIG. 1.

Oxygen 18 is communicated to an oxygen-receiving plenum 25 included in burner apparatus 12 and is then split into primary oxygen 18P and staged oxygen 18S as suggested in FIG. 1. Primary oxygen 18P is communicated to flame chamber 24 so as to mix with fuel 16 discharged by fuel-discharge nozzle 10 to produce a combustible mixture 19 that can be ignited to produce a flame 30 as suggested in FIG. 1. Staged oxygen 18S is communicated to a flame-receiving channel 40 located downstream of flame chamber 24 to reach the tip 30T of flame 30 to provide further oxygen to flame 30 to complete combustion of the fuel 16 discharged by fuel-discharge nozzle 10 and associated with flame 30 as also suggested in FIG. 1.

A field-adjustable oxygen controller 100 is coupled to oxygen-receiving plenum 25 as suggested in FIG. 1 and operated as suggested in FIGS. 9-18 to change the ratio of primary oxygen 18P to staged oxygen 18S by controlling the discharge of oxygen 18 from oxygen-receiving plenum 25 either to (1) the root 30R of flame 30 in flame chamber 24 or (2) the tip 30T of flame 30 in flame-receiving channel 40. A human operator in the field present at burner apparatus 12 can operate field-adjustable oxygen controller either to (1) divert more oxygen 18 from oxygen-receiving plenum 25 as primary oxygen 18P to root 30R of flame 30 and proportionally less oxygen 18 from oxygen-receiving plenum 25 as staged oxygen 18S to tip 30T of flame 30 or (2) divert more oxygen 18 from oxygen-receiving plenum 25 as staged oxygen 18S to tip 30T of flame 30 and proportionally less oxygen 18 as primary oxygen 18P to root 30R of flame 30. This ratio of primary oxygen to staged oxygen can be changed without any disassembly of burner apparatus 12 or substitution of any components included in burner apparatus 12. Burner apparatus 12 is also configured to ensure that the level of primary oxygen discharged from oxygen-receiving plenum 25 to the root 30R of flame 30 never falls below a predetermined minimum level regardless of the operation of field-adjustable oxygen controller 100 to preserve flame stability and minimize emissions.

Primary oxygen 18P combines with fuel 16 to form a combustible mixture 19 in a first-stage combustion zone $Z_1$ that can be ignited to produce a flame 30 having a root 30R and a tip 30T as suggested in FIG. 1. Staged oxygen 18S is oxygen that is delayed in its exposure to fuel 16 (as compared to primary oxygen 18P) and supplied to tip 30T of flame 30 to combine with any remaining unburned fuel 16 in a downstream second-stage combustion zone $Z_2$ to burn the fuel completely as also suggested in FIG. 1. Total oxygen is the amount of oxygen that is required to burn a certain amount of fuel. Total oxygen required to burn fuel completely is equal to the sum of primary oxygen 18P and staged oxygen 18S provided to mix with a predetermined amount of fuel 16. Burner apparatus 12 uses staged oxygen technology to produce lower pollutant emissions while improving furnace efficiency with higher flame temperature oxygen combustion.

In use, fuel 16 from fuel supply 116 is caused to flow in fuel-discharge nozzle 10 and exit into flame chamber 24 through a fuel-discharge outlet 34 formed in fuel-discharge nozzle 10 as suggested in FIG. 1. Oxygen 18 from oxygen supply 118 is discharged into a primary-oxygen chamber 26I included in an oxygen-supply housing 26 provided in nozzle-support fixture 20 and caused to move through an oxygen-flow passageway 28 interconnecting primary-oxygen chamber 26I of oxygen-supply housing 26 and flame chamber 24 and containing a downstream portion of fuel-discharge nozzle 10 as suggested in FIG. 1. In an illustrative embodiment, oxygen-supply housing 26 includes a downstream wall 26W that is formed to include an oxygen-discharge outlet 27 opening into oxygen-flow passageway 28 formed in burner block 22 so that primary oxygen 18P can flow from primary-oxygen chamber 26I through oxygen-discharge outlet 27 into oxygen-flow passageway 28. Fuel 16 discharged from fuel-discharge nozzle 10 mixes with primary oxygen 18P discharged from oxygen-flow passageway 28 to produce a combustible oxygen-fuel mixture 19 which is ignited in flame chamber 24 to produce an illustrative flat flame 30 as suggested in FIGS. 1 and 2.

Fuel-discharge nozzle 10 includes a fluid conductor 32 configured to conduct fuel 16 therethrough. Fluid conductor 32 is formed to include a downstream fuel-discharge outlet 34 and a fuel-inlet pipe 36 coupled to an upstream portion of fuel conductor 32 as shown, for example, in FIGS. 1 and 2. Fluid conductor 32 is formed to include an upstream fuel-receiving plenum 56 and a downstream fuel-transport passageway 37 interconnecting fuel-receiving plenum 56 and fuel-discharge outlet 34 as suggested in FIG. 1. Fuel-inlet pipe 36 is adapted to be coupled to fuel supply 116 via any suitable supply line 116L as suggested in FIGS. 1 and 2 and is configured to discharge fuel 16 into fuel-receiving plenum 56 of fuel conductor 32.

Burner apparatus 12 is provided for combining oxygen and fuel to produce a combustible mixture 19 that can be ignited to produce a flame 30 as suggested in FIG. 1. Burner apparatus 12 includes an oxygen-receiving plenum 25 adapted to receive pressurized oxygen 18 from an oxygen source 118 via any suitable supply line 118L, a fuel supply system including a fuel-discharge nozzle 10 configured to discharge fuel 16 to a first-stage combustion zone $Z_1$ associated with the root 30T of a flame 30, and an oxygen-supply system including an oxygen conductor including a primary oxygen supply conduit 26I, 27, 28, a staged oxygen-supply conduit 29, and a field-adjustable oxygen controller 100 as suggested in FIGS. 1 and 2.

Primary oxygen-supply conduit 26I, 27, 28 is arranged to couple the oxygen-receiving plenum 25 in fluid communication with the first-stage combustion zone $Z_1$ to provide primary oxygen 18P to mix with fuel 16 discharged from fuel-discharge nozzle 10 to produce a combustible mixture 19 that can be ignited to produce the flame 30. It is possible that some of fuel 16 is uncombusted as it leaves first-stage combustion zone $Z_1$.

Figure 8:
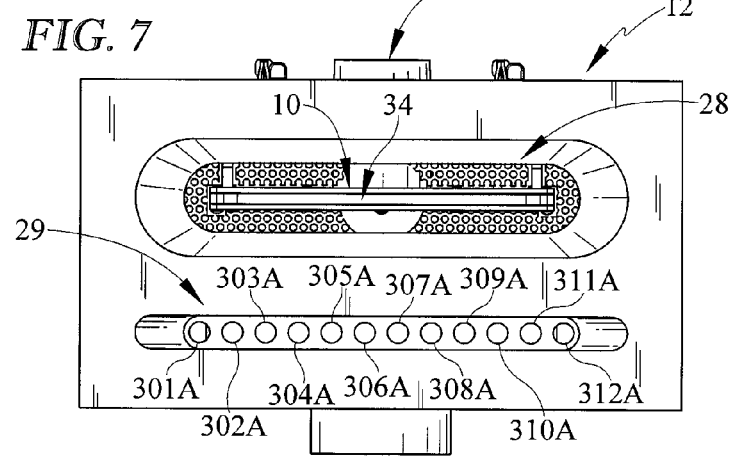
FIG. 8 is a view of a downstream end of the oxygen-fuel burner unit of FIGS. 1 and 2 showing the inlet opening of the flame chamber.
Figure 9:
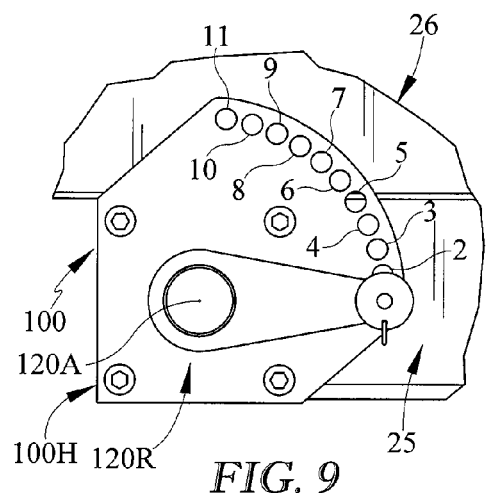
FIGS. 9-18 show various rotated positions of the rotatable oxygen-flow control valve in the oxygen-diversion passageway under the control of an external valve rotator to vary the flow of primary oxygen from the oxygen-receiving plenum into the primary-oxygen chamber of the primary oxygen-supply housing and proportionally vary the flow of staged oxygen from the oxygen-receiving plenum through the staged oxygen supply conduit.

Staged oxygen supply conduit 29 is arranged to couple oxygen-receiving plenum 25 in fluid communication with a second-stage combustion zone $Z_2$ arranged to lie in spaced-apart relation to fuel-discharge nozzle 10 to locate the first-stage combustion zone $Z_1$ therebetween and associated with tip 30T of flame 30 to provide staged oxygen 18S to mix with uncombusted fuel 16 associated with flame 30 to complete combustion of fuel 16 discharged from fuel-discharge nozzle 10. In an illustrative embodiment, staged oxygen supply conduit 29 is arranged to bypass flame chamber 24 and formed in burner block 22 as suggested in FIGS. 1, 2, and 8.

Field-adjustable oxygen controller 100 is configured to provide means for varying the ratio of primary oxygen 18P flowing from oxygen-receiving plenum 25 through the primary oxygen conduit 26I, 27, 28 to the first-stage combustion zone $Z_1$ associated with root 30R of flame 30 to staged oxygen 18S flowing from oxygen-receiving plenum 25 through the staged oxygen supply conduit 29 to the second-stage combustion zone 4 associated with tip 30T of flame 30 while maintaining at least a minimum flow of pressurized oxygen from oxygen-receiving plenum 25 as primary oxygen 18P to the first-stage combustion zone $Z_1$ through constant-flow oxygen-inlet orifices (e.g., R1, R2, C1, C2, C3, C4, L1, L2) configured to communicate pressurized oxygen from oxygen-receiving plenum 25 to primary oxygen conduit 26I, 27, 28. It is desired to maintain at least a minimum flow of primary oxygen 18P to the first-stage combustion zone $Z_1$.

Figure 3A:
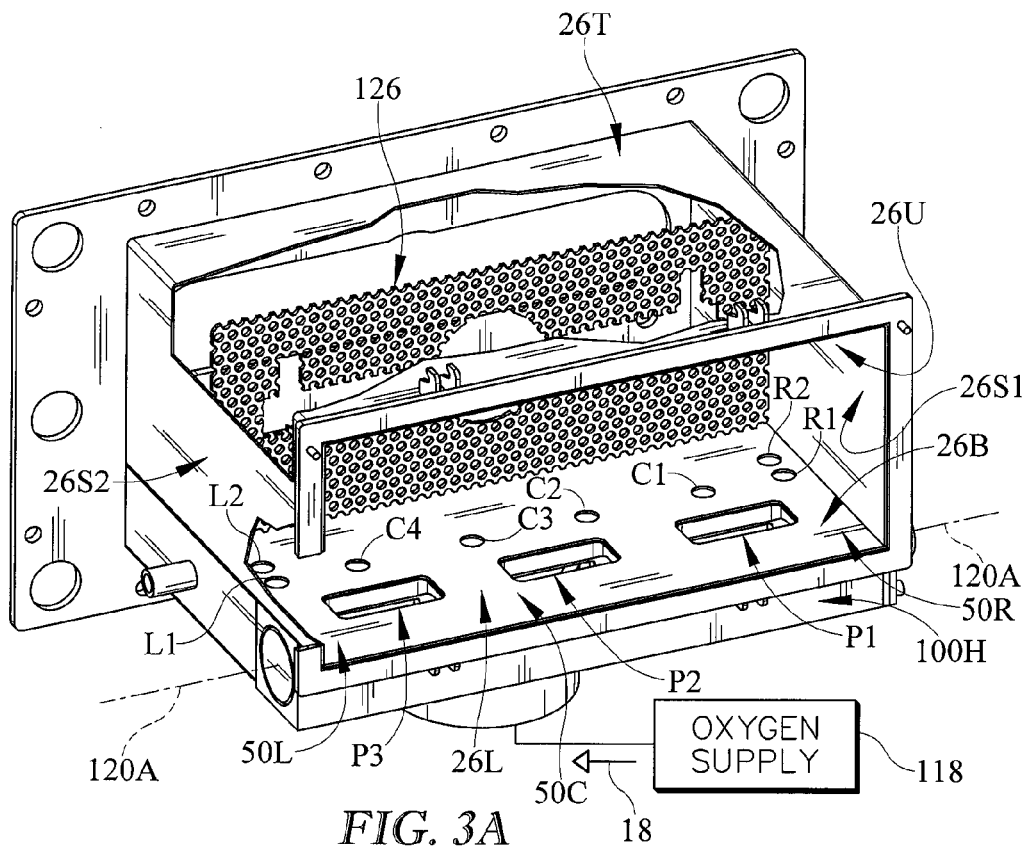
FIG. 3A is an enlarged perspective view of a portion of the oxygen-fuel burner unit of FIG. 2 with the fuel-discharge nozzle omitted and portions of the primary oxygen-supply housing broken away to show a vertically extending oxygen-diffusion screen located in the primary-oxygen chamber, an inlet opening of an oxygen-flow passageway leading to the flame chamber in a position downstream from the oxygen-diffusion screen, and that a boundary wall (e.g., floor) of the oxygen-supply housing is formed to include eight round downstream constant-flow oxygen-admission orifices lying upstream of the oxygen-diffusion screen and communicating with the oxygen-receiving plenum provided below the boundary wall to cause pressurized oxygen extant in the oxygen-receiving plenum to flow as primary oxygen constantly into the oxygen-supply chamber of the primary oxygen-supply housing for passage into the flame chamber through the inlet opening of the oxygen-flow passageway and showing that the primary oxygen-supply housing boundary wall (e.g., floor) is also formed to include three rectangular upstream variable-flow oxygen-admission ports communicating with the oxygen-diversion passageway lying under the boundary wall (e.g., floor) of the primary oxygen-supply housing so that all of the supplemental primary oxygen diverted to flow through the oxygen-diversion passageway by operation of the oxygen flow-control valve passes into the primary-oxygen chamber of the primary oxygen-supply housing through these three rectangular upstream variable-flow oxygen-admission ports.

Field-adjustable control means 100 comprises (1) at least one constant-flow oxygen-inlet orifice (e.g., R1, R2, C1, C2, C3, C4, L1, L2) provided to communicate pressurized primary oxygen 18P from oxygen-receiving plenum 25 to the first-stage combustion zone $Z_1$ as suggested in FIGS. 1, 2, and 3A and (2) an oxygen-flow control valve 120 mounted for rotation about an axis of rotation 120A in response to actuation of valve rotator 120R between an opened position (see FIG. 10) allowing flow of pressurized oxygen from oxygen-receiving plenum 25 through an oxygen-diversion passageway 110 to the first-stage combustion zone $Z_1$ and a closed position (see FIG. 18) blocking flow of pressurized oxygen from oxygen-receiving plenum 25 through the oxygen-diversion passageway 110 to the first-stage combustion zone $Z_1$ without blocking flow of pressurized oxygen from oxygen-receiving plenum 25 through the at least one constant-flow oxygen-inlet orifice (e.g., R1, R2, C1, C2, C3, C4, L1, L2).

An oxygen-delivery system in accordance with the present disclosure comprises an oxygen-receiving plenum 25 adapted to receive pressurized oxygen from an oxygen source 118 and a primary oxygen-supply housing 26. Primary oxygen-supply housing 26 is formed as suggested in FIGS. 1-4 to include a primary-oxygen chamber 26I, an oxygen-discharge outlet 27 opening into primary-oxygen chamber 26I, and a boundary wall 26B arranged to form a boundary of primary-oxygen chamber 26I and to include several constant-flow oxygen-inlet orifices (e.g., R1, R2, C1, C2, C3, C4, L1, L2) arranged to communicate pressurized oxygen constantly from oxygen-receiving plenum 25 into the primary-oxygen chamber 26I of primary oxygen-supply housing 26 to establish at least a minimum level of primary oxygen 18P in primary oxygen-supply housing 26. The oxygen-delivery system further comprises a staged-oxygen conduit 29 coupled in fluid communication to oxygen-receiving plenum 25 and configured to conduct staged oxygen 18S discharged under pressure from oxygen-receiving plenum 25 to the second-stage combustion zone $Z_2$ without passing through primary-oxygen chamber 26I as suggested in FIGS. 1 and 2.

Fuel-discharge nozzle 10 is arranged to lie partly in the primary-oxygen chamber 26I and extend through oxygen-discharge outlet 27 and oxygen-flow passageway 28 to reach a first-stage combustion zone $Z_1$ located outside of primary-oxygen chamber 26I as suggested in FIG. 1. Fuel-discharge nozzle 10 is configured to conduct fuel 16 received from a fuel source 116 to the first-stage combustion zone $Z_1$ to mix with primary oxygen 18P exiting the primary-oxygen chamber 26I through oxygen-discharge outlet 27 and passing through oxygen-flow passageway 28 to establish a combustible oxygen-fuel mixture 19 in the first-stage combustion zone $Z_1$ that is ignitable to produce a flame 30 having a root 30R lying in the first-stage combustion zone $Z_1$ and a tip 30T lying in a second-stage combustion zone $Z_2$ located in flame-receiving channel 40 downstream from the first-stage combustion zone $Z_1$.

A variable oxygen-diversion system 100 is included in burner apparatus 12 and configured to provide means for diverting a variable amount of pressurized oxygen 18 extant in oxygen-receiving plenum 25 to flow from oxygen-receiving plenum 25 into primary-oxygen chamber 26I without flowing through the constant-flow oxygen-inlet orifices (e.g., R1, R2, C1, C2, C3, C4, L1, L2) to supplement pressurized oxygen 18 admitted into primary-oxygen chamber 26I through the constant-flow oxygen-inlet orifices (e.g., R1, R2, C1, C2, C3, C4, L1, L2) so that more primary oxygen 18P is provided in primary-oxygen chamber 26I and delivered through the oxygen-discharge outlet 27 formed in primary oxygen-supply housing 26 to the first-stage combustion zone $Z_1$ and proportionally less staged oxygen 18S is delivered through the staged-oxygen (flame-chamber bypass) passageways 301-312 included in the staged-oxygen conduit 29 to the second-stage combustion zone $Z_2$.

Variable oxygen-diversion system 100 is formed to include an oxygen-diversion passageway 110 and a movable oxygen-flow control valve 120 as suggested in FIGS. 1 and 9-18. Oxygen-diversion passageway 110 is arranged to connect oxygen-receiving plenum 25 in fluid communication with primary-oxygen chamber 26I as suggested in FIGS. 1, 2, 3A, 3B, 4A, and 4B. Oxygen-flow control valve 120 is arranged to extend into oxygen-diversion passageway 110 and move therein in response to a signal provided by valve rotator 120R to vary the flow of pressurized oxygen 18 as a primary oxygen 18P from oxygen-receiving plenum 25 into primary-oxygen chamber 26I of primary oxygen-supply housing 26.

Figure 3B:
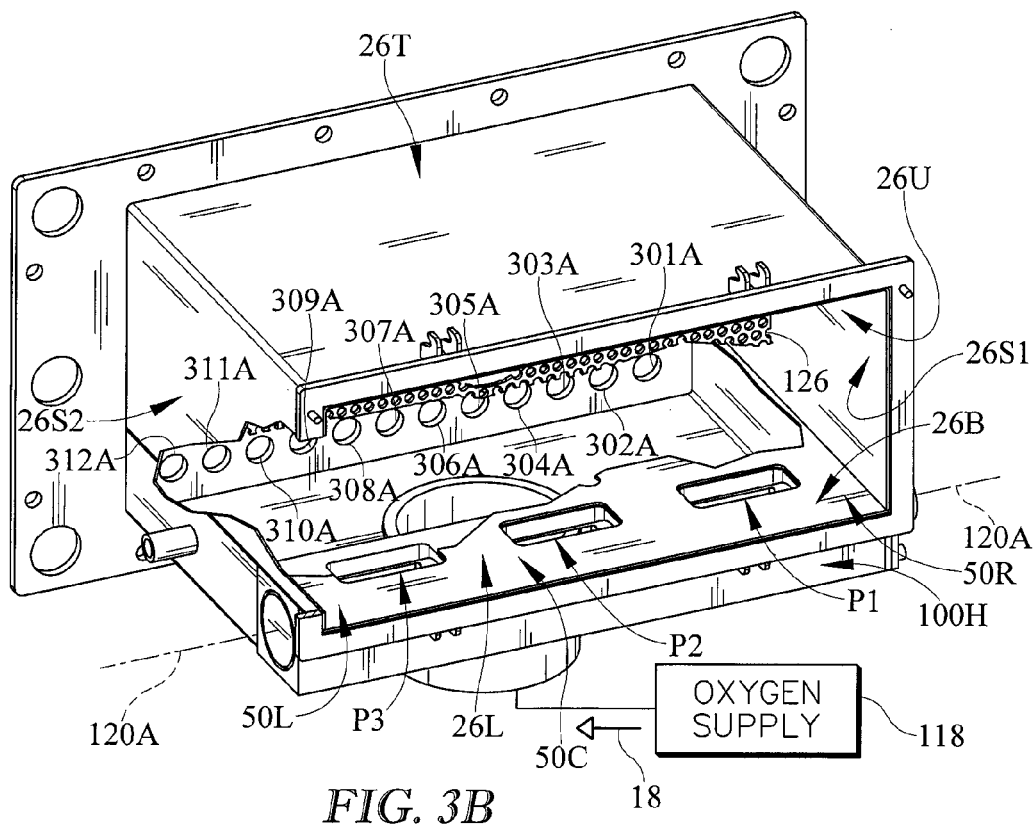
FIG. 3B is a perspective view similar to FIG. 3A showing a series of twelve staged oxygen-inlet ports opening into a staged oxygen conduit formed in the burner block to allow some of the pressurized oxygen extant in the oxygen-receiving plenum to flow constantly as staged oxygen through the staged oxygen conduit to reach a second-stage combustion zone near the tip of the flame as suggested in FIG. 1.

Primary oxygen-supply housing 26 includes a floor provided by boundary wall 26B, a ceiling provided by top wall 26T, a downstream wall 26W formed to include oxygen-discharge outlet 27, and spaced-apart first and second side walls 26S1, 26S2 arranged to interconnect boundary and top walls 26B, 26T and downstream wall 26W to form a primary-oxygen chamber 26I therebetween as shown, for example, in FIGS. 2, 3A, and 3B. Boundary wall 26B of primary oxygen-supply housing 26 is formed to include at least one variable-flow oxygen-admission port (e.g., P1, P2, P3) opening into oxygen-diversion passageway 110 as suggested in FIGS. 1-4. These oxygen-admission ports P1, P2, P3 have a rectangular shape in the illustrated embodiment.

Each variable-flow oxygen-admission port (e.g., P1, P2, P3) is arranged to lie in upstream and spaced-apart relation to the oxygen-discharge outlet 27 formed in downstream wall 26W and associated with primary-oxygen chamber 26I. Constant-flow oxygen-inlet orifices (e.g., R1, R2, C1, C2, C3, C4, L1, L2) are arranged to lie in a downstream space provided between the variable-flow oxygen-admission ports P1, P2, P3 and the oxygen-discharge outlet 27.

Boundary wall 26B provides a floor of primary oxygen supply housing 26 and a ceiling of oxygen-receiving plenum 25 as suggested in FIGS. 1-4. A side wall 25S1 of oxygen-receiving plenum 25 is formed to include a primary-oxygen aperture 113A opening into oxygen-diversion passageway 110 (see FIGS. 1 and 10) through which pressurized oxygen exiting oxygen-receiving plenum 25 flows when oxygen-flow control valve 120 is moved to an opened position as suggested in FIG. 10. A side wall 25S2 of oxygen-receiving plenum 25 is formed to include a staged-oxygen aperture opening (e.g., 301A-312A) into the staged oxygen conduit 29 through which pressurized staged oxygen 18S flows constantly toward the second-stage combustion zone $Z_2$.

Primary oxygen-supply housing 26 includes first and second side walls 26S1, 26S2 arranged to lie in spaced-apart relation to locate boundary wall 26B therebetween to cause boundary wall 26B to extend from first side wall 26S1 to second side wall 26S2 as suggested in FIGS. 2-4. Oxygen-diversion passageway 110 is arranged to extend laterally along an underside of boundary wall 26B in a direction from first side wall 26S1 toward second side wall 26S2. Boundary wall 26B is formed to include a left upstream (variable-flow) oxygen-admission port P3 opening into oxygen-diversion passageway 110 and lying in spaced-apart relation to first side wall 26S1 and a right upstream (variable-flow) oxygen-admission port P1 opening into oxygen-diversion passageway 110 and lying between the left upstream oxygen-admission port P3 and first side wall 26S1 as shown, for example, in FIGS. 3A and 3B. A center upstream (variable flow) oxygen-admission port P2 is formed in boundary wall 26B to open into oxygen-diversion passageway 110 and lie between ports P1, P3.

Figure 10:
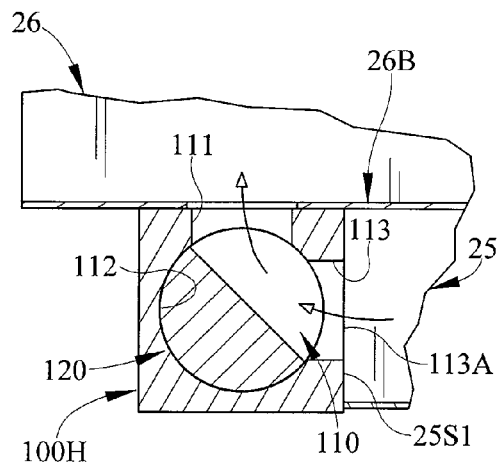
Figure 11:
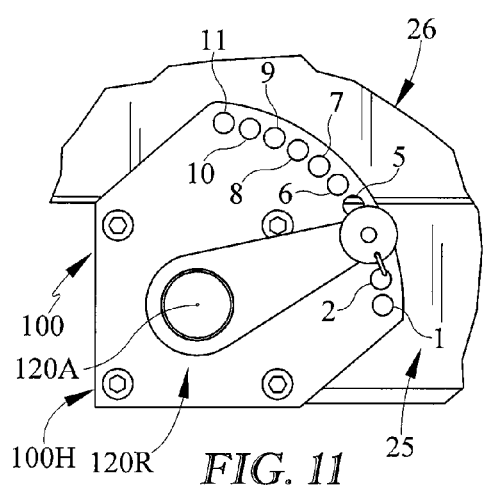
Figure 12:
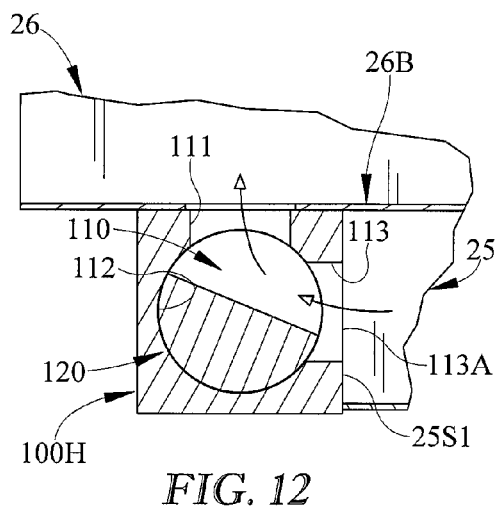
Figure 13:
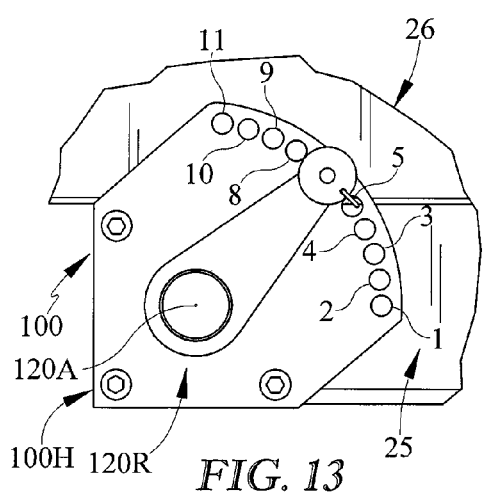
Figure 14:
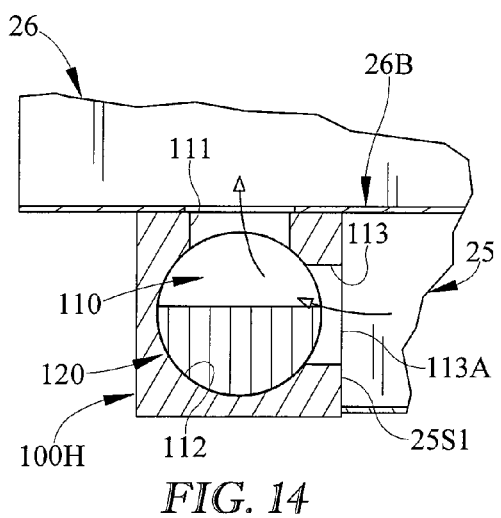
Figure 15:
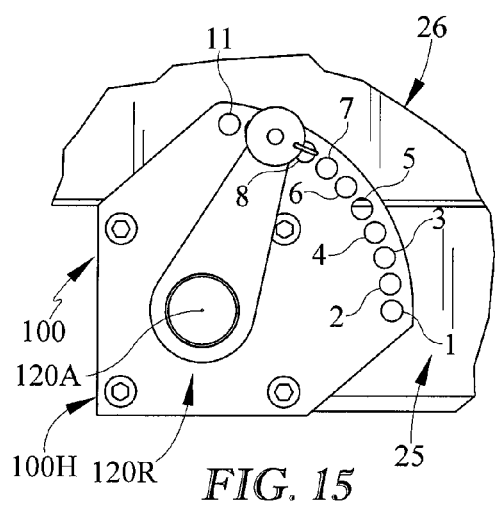
Figure 16:
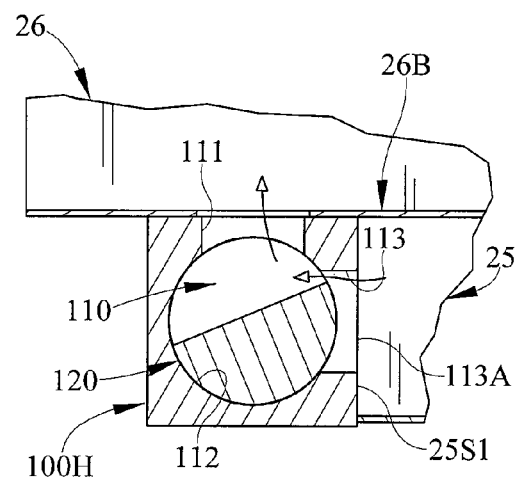
Figure 17:
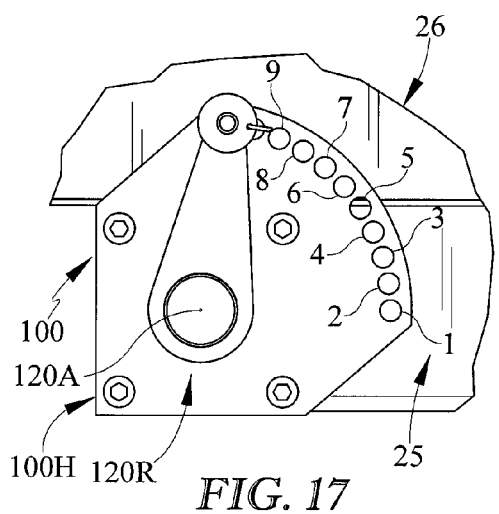
Figure 18:
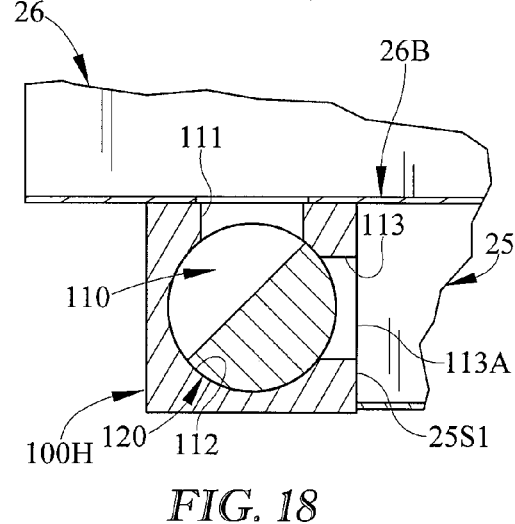

Oxygen-diversion passageway 110 includes a central valve-receiver channel 112 receiving oxygen-flow control valve 120 and supporting oxygen-flow control valve 120 for rotation about an axis 120A as shown, for example, in FIGS. 1 and 10, between an opened position communicating pressurized oxygen from oxygen-receiving plenum 25 to primary-oxygen chamber 26I through oxygen-diversion passageway 110 as suggested in FIG. 10 and a closed position blocking flow of pressurized oxygen from oxygen-receiving plenum 25 to primary-oxygen chamber 26I through oxygen-diversion passageway 110 as suggested in FIG. 18.

Variable oxygen-diversion system 100 includes a diverter housing 100H arranged to extend along an underside of boundary wall 26B from first side wall 26S1 to second side wall 26S2 as suggested in FIGS. 3A, 3B, 4A, and 4B. Diverter housing 100H is formed to include an elongated oxygen-distribution channel 111, a primary oxygen-intake channel 113, and a central valve-receiver channel 112. Elongated oxygen-distribution channel 111 is arranged to extend between first and second side walls 26S1, 26S2 and coupled in fluid communication to each of the left and right upstream oxygen-admission ports P3, P1 and to a center upstream oxygen-admission port P2 located between left and right upstream oxygen-admission ports P3, P1 as suggested in FIGS. 3 and 4. Primary-oxygen-intake channel 113 opens into oxygen-receiving plenum 25. Central valve-receiver channel 112 connects elongated oxygen-distribution channel 111 in fluid communication with primary-oxygen-intake channel 113 and supports oxygen-flow control valve 120 therein for movement between an opened position (see FIG. 10) allowing flow of pressurized oxygen from oxygen-receiving plenum 25, in series, through oxygen-intake channel 113, central valve-receiver channel 112, elongated oxygen-distribution channel 111, and each of the left, center, and right upstream oxygen-admission ports P3, P2, P1 into primary-oxygen chamber 26I and a closed position (see FIG. 18) blocking flow of pressurized oxygen from oxygen-receiving plenum 25, in series, through oxygen-intake channel 113, central valve-receiver channel 112, elongated oxygen-distribution channel 111, and each of the left, center, and right upstream oxygen-admission ports P3, P2, P1 into primary-oxygen chamber 26I.

Figure 5:
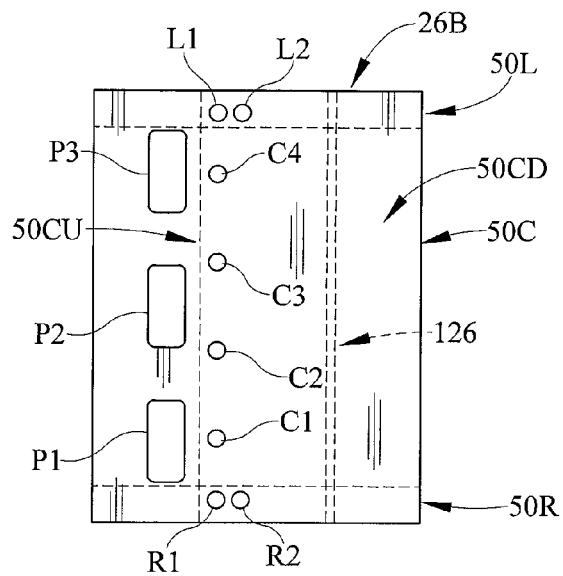
FIG. 5 is a sectional view taken along line 5-5 of FIG. 1 showing the three rectangular upstream variable-flow oxygen-admission ports and the eight round downstream constant-flow oxygen-admission ports formed in the floor of the primary oxygen-supply housing.
Figure 6:
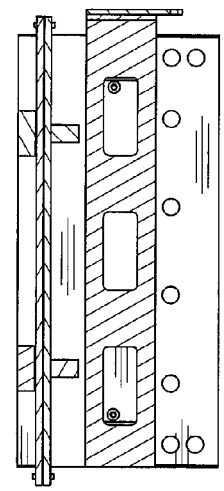
FIG. 6 is a sectional view taken along line 6-6 of FIG. 1.
Figure 7:
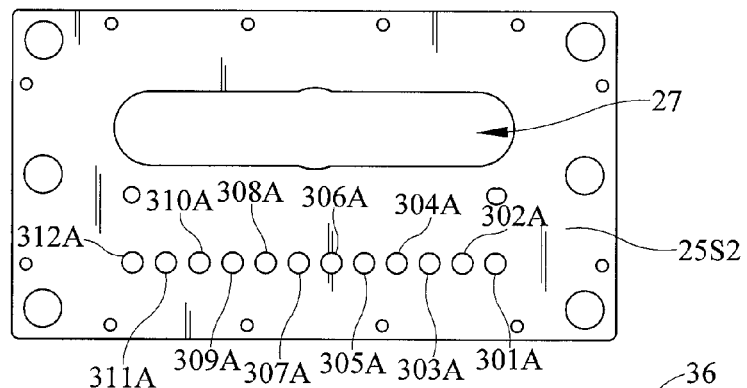
FIG. 7 is a sectional view taken along line 7-7 of FIG. 1 showing that a downstream vertical wall of the primary oxygen-supply housing is formed to include the inlet opening of the oxygen-flow passageway leading to the flame chamber and (below that) a series of twelve staged-oxygen apertures opening into a staged oxygen conduit formed in the burner block.

Boundary wall 26B includes a right border strip 50R, a left border strip 50L, and a center panel 50C as suggested in FIGS. 3-5. Right border strip 50R is located between the right upstream oxygen-admission port P1 and first side wall 26S1 of primary oxygen-supply housing 26 and formed to include constant-flow oxygen-inlet orifices R1, R2. Left border strip 50L is located between the left upstream oxygen-admission port P3 and second side wall 26S2 of primary oxygen-supply housing 26 and formed to include constant-flow oxygen-inlet orifices L1, L2. Center panel 50C is located between the left and right border strips 50L, 50R and formed to include constant-flow oxygen-inlet orifices (e.g., C1, C2, C3, C4).

Primary oxygen-supply housing 26 includes first and second side walls 26S1, 26S2 arranged to lie in spaced-apart relation to locate boundary wall 26B therebetween to cause boundary wall 26B to extend from first side wall 26S1 to second side wall 26 as suggested in FIGS. 3 and 4. Boundary wall 26B is formed to include three variable-flow oxygen-admission parts P1, P2, P3 and eight constant-flow oxygen-inlet orifices R1, R2, C1, C2, C3, C4, L1, L2 in an illustrative embodiment shown in FIG. 4B.

Boundary wall 26B includes a right upstream oxygen-admission port opening P1 into oxygen-diversion passageway 110 and a right border strip 50R arranged to extend along first side wall 26S1 and lie between the right upstream (variable-flow) oxygen-admission port P1 and first side wall 26S1. Right border strip 50R is formed to include at least one of the downstream constant-flow oxygen-inlet orifices R1, R2.

Boundary wall 26B also includes a left upstream oxygen-admission port P3 opening into oxygen-diversion passageway 110 and a left border strip 50L arranged to extend along second side wall 26S2 and lie between the left upstream (variable-flow) oxygen-admission port 13 and second side wall 26S2. Left border strip 50L is formed to include at least one of the downstream constant-flow oxygen-inlet orifices L1, L2.

Boundary wall 26B also includes an upstream center panel 50CU and a downstream center panel 50CD as shown, for example, in FIGS. 3A and 5. Upstream center panel 50CU is arranged to lie between the right and left border strips 50R, 50L and formed to include the right, center, and left upstream oxygen-admission ports P1, P2, P3. Downstream center panel 50CD is arranged to lie between the right and left border strips 50R, 50L and between the upstream center panel 50CU and the oxygen-discharge outlet 27 formed in downstream wall 26W and associated with primary-oxygen chamber 26I and formed to include downstream constant-flow oxygen-inlet orifices R1, R2, C1, C2, C3, C4, L1, L2.

Primary oxygen-supply housing 26 further includes a top wall 26T arranged to lie in spaced-apart relation to boundary wall 26B and coupled to first and second side walls 26S1, 26S2 to locate primary-oxygen chamber 26I therebetween. Fuel-discharge nozzle 10 is arranged to lie between top wall 26T and boundary wall 26B to define an upper region 26U of primary-oxygen chamber 26I located between top wall 26T and fuel-discharge nozzle 10 and a lower region 26L of primary-oxygen chamber 26I located between fuel-discharge nozzle 10 and boundary wall 26B as suggested in FIGS. 1, 3, and 4.

The downstream constant-flow oxygen-inlet ports R1, R2 formed in the right border strip 50R of boundary wall 26B is formed to define right jet means for discharging a stream of pressurized oxygen exiting air-receiving plenum 25 up and over fuel-discharge nozzle 10 from the lower region 26L into the upper region 26U of primary-oxygen chamber 26I to flow in a direction generally toward second side wall 26S2. The downstream constant-flow oxygen-inlet ports L1, L2 formed in the left-border strip 50L of the boundary wall 26B is formed to define left jet means for discharging a stream of pressurized oxygen exiting oxygen-receiving plenum 25 up and over fuel-discharge nozzle 10 from the lower region 26L into the upper region 26U of primary-oxygen chamber 26I in a direction generally toward first side wall 26S1 to commingle with the stream of pressurized oxygen discharged by the right jet means and flow into and through the oxygen-discharge outlet 27 formed in downstream wall 26W. Streams of pressurized oxygen exiting oxygen-receiving plenum 25 through the left, center, and right upstream (variable-flow) oxygen-admission ports P3, P2, P1 formed in the upstream center panel 50CU and through the constant-flow oxygen-inlet ports R1, R2, C1, C2, C3, C4 formed in the downstream center panel 50CD flow into and through the lower region 26L of primary-oxygen chamber 26I to reach and flow through the oxygen-discharge outlet 27 formed in downstream wall 26W. Upstream center panel 50CU includes a middle upstream oxygen-admission port P2 lying between and in spaced-apart relation to the right and left upstream oxygen-admission ports P1, P3 and opening into oxygen-diversion passageway 110 and communicating with the lower region 26L of primary-oxygen chamber 26I.

Two constant-flow oxygen-inlet ports L1, L2 are formed in the left border strip 50L. Four constant-flow oxygen-inlet ports C1, C2, C3, C4 are formed in the downstream center panel 50CD and arranged to lie in spaced-apart relation to one another and lie in a space provided between the two constant-flow oxygen-inlet ports R1, R2 formed in the right border strip 50R and the two constant-flow oxygen-inlet ports L1, L2 formed in the left border strip 50L.

Oxygen-flow control valve 120 is supported for rotation about an axis 120A of rotation between an opened position (shown, for example, in FIG. 10) communicating pressurized oxygen from the oxygen-receiving plenum 25 to primary-oxygen chamber 26I through oxygen-diversion passageway 110 and the right, center, and left upstream (variable-flow) oxygen-admission ports P1, P2, P3 and a closed position (shown, for example, in FIG. 18) blocking flow of pressurized oxygen from oxygen-receiving plenum 25 to primary-oxygen chamber 26I through oxygen-diversion passageway 110 and the right, center, and left upstream (variable-flow) oxygen-admission ports P1, P2, P3. As shown, for example, in FIG. 4B, constant-flow oxygen-inlet port R1 formed in the right border strip 50R, the four constant-flow oxygen-inlet ports C1, C2, C3, C4 formed in the downstream center panel 50CD, and constant-flow oxygen-inlet port L1 formed in the left border strip 50L are arranged to extend in series generally along a reference line RL that is arranged to lie in substantially parallel spaced-apart relation to the axis of rotation 120A of oxygen-flow control valve 120.

Primary oxygen-supply housing 26 further includes a downstream wall 26W and an oxygen-diffuser screen 126. Downstream wall 26W is arranged to interconnect first and second side walls 26S1, 26S2 and formed to include the oxygen-discharge outlet 27. Oxygen-diffuser screen 126 is arranged to lie between the downstream constant-flow oxygen-inlet ports R1, R2, C1, C2, C3, C4, L1, L2 and downstream wall 26W to partition primary-oxygen chamber 26I into an upstream section and a downstream section 126D as shown in FIGS. 1 and 2. Upstream section 126U communicates with the upstream (variable-flow) oxygen-admission ports P1, P2, P3 and the downstream constant-flow oxygen-inlet ports R1, R2, C1, C2, C3, C4, L1, L2. Downstream section 126D communicates with the oxygen-discharge outlet 27. Fuel-discharge nozzle 110 is arranged to extend through a nozzle-receiving slot 127 formed in oxygen-diffuser screen 126. Oxygen-diffuser screen 126 is formed to include an array of holes cooperating to define means for diffusing the flow of pressurized primary oxygen 18P passing from the upstream section 126U into the downstream section 126D toward the oxygen-discharge outlet 27 formed in downstream wall 26W.

In an illustrative embodiment of the present disclosure, only one oxygen-flow control valve 120 is employed to control the total flow of oxygen 18 to a flame 30 created in burner apparatus 12 based on a selected ratio of fuel flow to oxygen flow. Adjustment of oxygen-staging ratio is internal to burner apparatus 12 in illustrative embodiments of the present disclosure. Burner apparatus 12 is configured to provide human operator controlled adjustment of the oxygen-staging ratio and also a fixed means for limiting such adjustment to establish a minimum level of primary oxygen to maintain burner apparatus 12 to operate within established performance limits.

A burner apparatus 12 is provided with a single external combustion oxygen connection as suggested in FIG. 1. Internal to the burner housing 22, 25, 26, 100H are two chambers (26I, 28) and (25) representing the primary and staged oxygen passageways. A single external oxygen connection is positioned on the housing to connect directly into the staged-oxygen chamber provided by oxygen-receiving plenum 25. In order to provide the range of oxygen-staging ratios that are optimal for each fuel burned, a control valve 120 of adequate size and resolution (accuracy) is positioned inside the oxygen housing 100H, 26, 22, 25. Fixed orifices (R1, R2, C1, C3, C3, C4, L1, L2) are formed between the staged and the primary chambers to provide a specified volume of flow at a given pressure. Another set of fixed orifices (301A-312A) function to provide a specified volume of flow at a given pressure and are formed between the staged chamber 25 and the staged oxygen supply conduit 29 through the staged chamber wall 26W and burner block 22. The size and position of these orifices provide for an oxygen ratio of approximately 30% primary and 70% staged. This means that with the oxygen-control valve 120 fully closed, the primary oxygen ratio cannot fall below 30%. It also means that the staged oxygen ratio is 70% when the oxygen valve 120 is fully closed, and cannot exceed that amount in operation. From the fully closed position, with an oxygen ratio of 30% primary/70% staged, the control valve 120 begins to open and allows oxygen in the staged chamber 25 to divert based on the effective open areas of the primary and staged orifices and the open area of the control valve 120. As this valve 120 opens, more oxygen in the staged chamber 25 diverts into the primary chamber 26I, thus raising the primary oxygen ratio and lowering the staged oxygen ratio. The oxygen-ratio control valve 120 is sized so that when it is fully open, its open flow area combined with the flow area of the primary fixed orifices (R1, R2, C1, C2, C3, C4, L1, L2) will equal 70% of the total flow area out of the staged chamber 25. The other 30% of the flow area out of the staged chamber 25 would be made up in the fixed orifices (R1, R2, C1, C2, C3, C4, L1, L2) that lead from the staged chamber 25 into the burner block 22 and outward to the flame zone 24.

Figure 19:
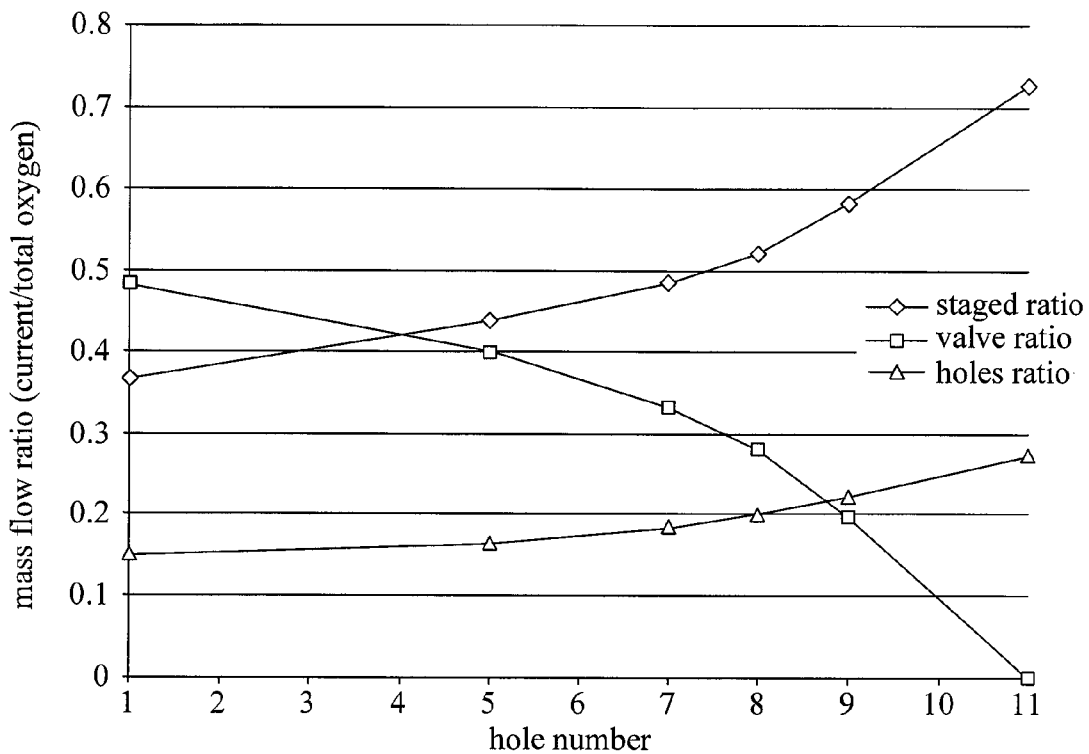
FIGS. 19 and 20 are graphs showing selected mass flow ratios vs. a specified "hole number" representing the degrees of valve opening of the rotatable oxygen-control valve shown in FIGS. 1, 10, 12, 14, 16, and 18.
Figure 20:
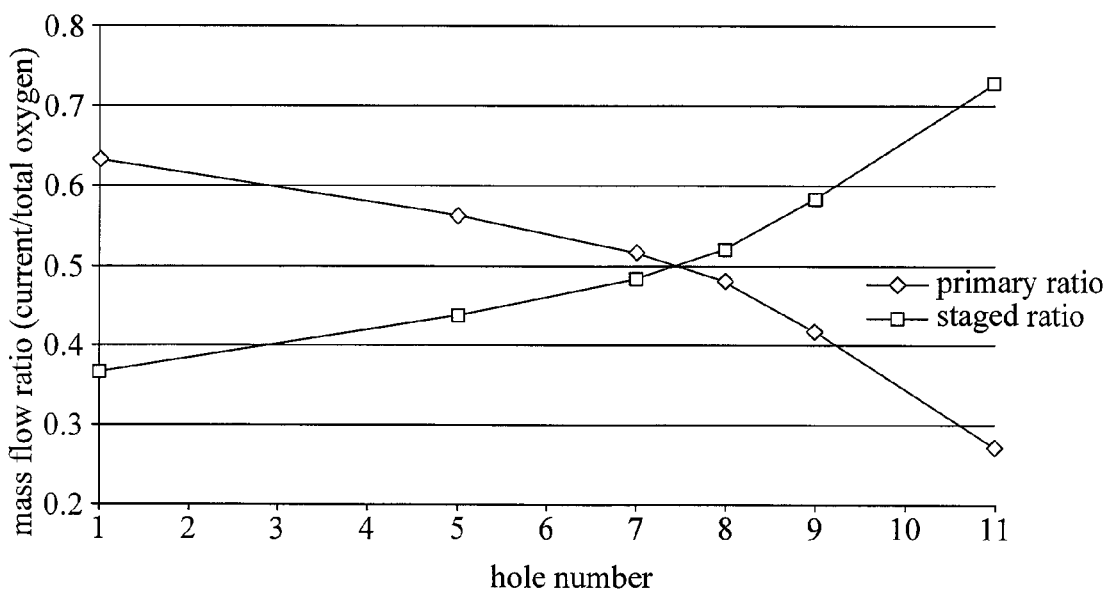

FIGS. 19 and 20 provide plots showing data obtained relating to the system disclosed herein. These plots help to illustrate what happens as control valve 120 is opened and closed. Data used in FIGS. 19 and 20 is provided below. In FIG. 19, the "holes ratio" represents the percentage of total oxygen flow that passes through the fixed orifices (R1, R2, C1, C2, C3, C4, L1, L2) formed between the staged and the primary chambers. The "holes ratio" plot in FIG. 19 indicates how the percentage of total oxygen flow rises as the valve is closed and pressure builds in oxygen-receiving plenum 25. The "valve" ratio in FIG. 19 is the percentage of total oxygen flow that passes through the control valve 120 as it is rotated. The X-axis "hole number" in FIGS. 19 and 20 refers to the hole position of the control valve indicator plate 120R and corresponds to a control valve opening angle as shown in the data below. In FIG. 20, the primary ratio represents the sum of the holes ratio plus the valve ratio from FIG. 19, since both flows pass into the primary chamber. The staged ratio in FIG. 20 remains equal to the staged ratio in FIG. 19.

| $1^{st}$ hole - FULL OPEN = 0° | |
|---|---|
| holes ratio | 0.1514 |
| staged ratio | 0.367 |
| valve ratio | 0.4816 |
| primary total | 0.633 |

| 5th hole = 32.72° | |
|---|---|
| holes ratio | 0.164 |
| staged ratio | 0.438 |
| valve ratio | 0.398 |
| primary total | 0.562 |

| 7th hole = 49.091 | |
|---|---|
| holes ratio | 0.185 |
| staged ratio | 0.484 |
| valve ratio | 0.331 |
| primary total | 0.516 |

| 8th hole = 57.27° | |
|---|---|
| holes ratio | 0.2 |
| staged ratio | 0.52 |

-continued

| 8th hole = 57.27° | |
|---|---|
| valve ratio | 0.28 |
| primary total | 0.48 |

| 9th hole = 65.45° | |
|---|---|
| holes ratio | 0.221 |
| staged ratio | 0.5826 |
| valve ratio | 0.1964 |
| primary total | 0.4174 |

| 11th hole - FULL CLOSED | |
|---|---|
| holes ratio | 0.272 |
| staged ratio | 0.727 |
| valve ratio | 0 |
| primary total | 0.272 |

In an illustrative embodiment, oxygen-ratio control valve 120 can be operated to vary the primary oxygen ratio from 27.2% to 63.3% and the staged oxygen ratio from 72.8% to 36.7%. These values include flow through the fixed orifices and through the opening provided by control valve 120. This provides stable burner operation and prevents the end user from setting a valve position that would produce a poor flame, poor efficiency, and increased levels of unwanted emissions.

The invention claimed is:

1. A burner apparatus for combining oxygen and fuel to produce a mixture to be burned, the burner apparatus comprising an oxygen-delivery system comprising an oxygen-receiving plenum adapted to receive pressurized oxygen from an oxygen source and a primary oxygen-supply housing formed to include a primary-oxygen chamber, an oxygen-discharge outlet opening into the primary-oxygen chamber, and a boundary wall arranged to form a boundary of the primary-oxygen chamber and to include several constant-flow oxygen-inlet orifices arranged to communicate pressurized oxygen constantly from the oxygen-receiving plenum into the primary-oxygen chamber of the primary oxygen-supply housing to establish primary oxygen in the primary oxygen-supply housing, a fuel-discharge nozzle arranged to lie partly in the primary-oxygen chamber and extend through the oxygen-discharge outlet to reach a first-stage combustion zone located outside of the primary-oxygen chamber and configured to conduct fuel received from a fuel source to the first-stage combustion zone to mix with primary oxygen exiting the primary-oxygen chamber through the oxygen-discharge outlet to establish a combustible oxygen-fuel mixture in the first-stage combustion zone that is ignitable to produce a flame having a root lying in the first-stage combustion zone and a tip lying in a second-stage combustion zone downstream from the first-stage combustion zone, wherein the oxygen-delivery system further comprises a staged-oxygen conduit coupled in fluid communication to the oxygen-receiving plenum and configured to conduct staged oxygen discharged under pressure from the oxygen-receiving plenum to the second-stage combustion zone without passing through the primary-oxygen chamber, and a variable oxygen-diversion system configured to provide means for diverting a variable amount of pressurized oxygen extant in the oxygen-receiving plenum to flow from the oxygen-receiving plenum into the primary-oxygen chamber without flowing through the constant-flow oxygen-inlet orifices to supplement pressurized oxygen admitted into the primary-oxygen chamber through the constant-flow oxygen-inlet orifices so that more primary oxygen is provided in the primary-oxygen chamber and delivered through the oxygen-discharge outlet formed in the primary oxygen-supply housing to the first-stage combustion zone and proportionally less staged oxygen is delivered through the staged-oxygen conduit to the second-stage combustion zone, wherein the variable oxygen-diversion system is formed to include an oxygen-diversion passageway arranged to connect the oxygen-receiving plenum in fluid communication with the primary-oxygen chamber and an oxygen-flow control valve arranged to extend into the oxygen-diversion passageway and move therein to vary the flow of pressurized oxygen from the oxygen-receiving plenum into the primary-oxygen chamber of the primary oxygen-supply housing.

2. The burner apparatus of claim 1, wherein the boundary wall of the primary oxygen-supply housing is formed to include a variable-flow oxygen-admission port opening into the oxygen-diversion passageway.

3. The burner apparatus of claim 2, wherein the variable-flow oxygen-admission port is arranged to lie in upstream and spaced-apart relation to the oxygen-discharge outlet associated with the primary-oxygen chamber and the constant-flow oxygen-inlet orifices are arranged to lie in a space provided between the variable-flow oxygen-admission port and the oxygen-discharge outlet.

4. The burner apparatus of claim 2, wherein the boundary wall provides a floor of the primary oxygen supply housing and a ceiling of the oxygen-receiving plenum, a side wall of the oxygen-receiving plenum is formed to include a primary-oxygen aperture opening into the oxygen-diversion passageway through which pressurized oxygen exiting the oxygen-receiving plenum flows when the oxygen-flow control valve is moved to an opened position and a staged-oxygen aperture opening into the staged oxygen conduit through which pressurized oxygen flows constantly toward the second-stage combustion zone.

5. The burner apparatus of claim 1, wherein the primary oxygen-supply housing includes first and second side walls arranged to lie in spaced-apart relation to locate the boundary wall therebetween to cause the boundary wall to extend from the first side wall to the second side wall, the oxygen-diversion passageway is arranged to extend laterally along an underside of the boundary wall in a direction from the first side wall toward the second side wall, the boundary wall is formed to include a left upstream oxygen-admission port opening into the oxygen-diversion passageway and lying in spaced-apart relation to the first side wall and a right upstream oxygen-admission port opening into the oxygen-diversion passageway and lying between the left upstream oxygen-admission port and the first side wall.

6. The burner apparatus of claim 5, wherein the oxygen-diversion passageway includes a central valve-receiver channel receiving the oxygen-flow control valve and supporting the oxygen-flow control valve for rotation about an axis between an opened position communicating pressurized oxygen from the oxygen-receiving plenum to the primary-oxygen chamber through the oxygen-diversion passageway and a closed position blocking flow of pressurized oxygen from the oxygen-receiving plenum to the primary-oxygen chamber through the oxygen-diversion passageway.

7. The burner apparatus of claim 5, wherein the variable oxygen-diversion system includes a diverter housing arranged to extend along an underside of the boundary wall from the first side wall to the second side wall and the diverter housing is formed to include an elongated oxygen-distribution channel arranged to extend between the first and second side walls and coupled in fluid communication to each of the left and right upstream oxygen-admission ports, a primary-oxygen-intake channel opening into the oxygen-receiving plenum, and a central valve-receiver channel connecting the elongated oxygen-distribution channel in fluid communication with the primary-oxygen-intake channel and supporting the oxygen-flow control valve therein for movement between an opened position allowing flow of pressurized oxygen from the oxygen-receiving plenum, in series, through the oxygen-intake channel, the central valve-receiver channel, the elongated oxygen-distribution channel, and each of the left and right upstream oxygen-admission ports into the primary-oxygen chamber and a closed position blocking flow of pressurized oxygen the oxygen-receiving plenum, in series, through the oxygen-intake channel, the central valve-receiver channel, the elongated oxygen-distribution channel, and each of the left and right upstream oxygen-admission ports into the primary-oxygen chamber.

8. The burner of claim 5, wherein the boundary wall includes a right border strip located between the right upstream oxygen-admission port and the first side wall of the primary oxygen-supply housing and formed to include a first of the several constant-flow oxygen-inlet orifices, a left border strip located between the left upstream oxygen-admission port and the second side wall of the primary oxygen-supply housing and formed to include a second of the several constant-flow oxygen-inlet orifices, and a center panel located between the left and right border strips and formed to include a third of the constant-flow oxygen-inlet orifices.

9. The burner of claim 1, wherein the primary oxygen-supply housing includes first and second side walls arranged to lie in spaced-apart relation to locate the boundary wall therebetween to cause the boundary wall to extend from the first side wall to the second side wall, and the boundary wall includes a right upstream oxygen-admission port opening into the oxygen-diversion passageway, a right border strip arranged to extend along the first side wall and lie between the right upstream oxygen-admission port and the first side wall and formed to include at least one of the downstream constant-flow oxygen-inlet orifices, a left upstream oxygen-admission port opening into the oxygen-diversion passageway, a left border strip arranged to extend along the second side wall and lie between the left upstream oxygen-admission port and the second side wall and formed to include at least one of the downstream constant-flow oxygen-inlet orifices, an upstream center panel arranged to lie between the right and left border strips and formed to include the right and left upstream oxygen-admission ports, and a downstream center panel arranged to lie between the right and left border strips and between the upstream center panel and the oxygen-discharge outlet associated with the primary-oxygen chamber and formed to include at least one of the downstream constant-flow oxygen-inlet orifices.

10. The burner of claim 9, wherein the primary oxygen-supply housing further includes a top wall arranged to lie in spaced-apart relation to the boundary wall and coupled to the first and second side walls to locate the primary-oxygen chamber therebetween, the fuel-discharge nozzle is arranged to lie between the top wall and the boundary wall to define an upper region of the primary-oxygen chamber located between the top wall and the fuel-discharge nozzle and a lower region of the primary-oxygen chamber located between the fuel-discharge nozzle and the boundary wall, the at least one of the downstream constant-flow oxygen-inlet ports formed in the right border strip of the boundary wall is formed to define right jet means for discharging a stream of pressurized oxygen exiting the air-receiving plenum up and over the fuel-discharge nozzle from the lower region into the upper region of the primary-oxygen chamber to flow in a direction generally toward the second side wall, and the at least one of the downstream constant-flow oxygen-inlet ports formed in the left-border strip of the boundary wall is formed to define left jet means for discharging a stream of pressurized oxygen exiting the oxygen-receiving plenum up and over the fuel-discharge nozzle from the lower region into the upper region of the primary-oxygen chamber in a direction generally toward the first side wall to commingle with the stream of pressurized oxygen discharged by the right jet means and flow into and through the oxygen-discharge outlet while streams of pressurized oxygen exiting the oxygen-receiving plenum through the left and right upstream oxygen-admission ports formed in the upstream center panel and through the at least one constant-flow oxygen-inlet port formed in the downstream center panel flows into and through the lower region of the primary-oxygen chamber to reach and flow through the oxygen-discharge outlet.

11. The burner of claim 9, wherein the upstream center panel further includes a middle upstream oxygen-admission port lying between and in spaced-apart relation to the right and left upstream oxygen-admission ports and opening into the oxygen-diversion passageway and communicating with the lower region of the primary-oxygen chamber.

12. The burner of claim 9, wherein two constant-flow oxygen-inlet ports are formed in the left border strip, and four constant-flow oxygen-inlet ports are formed in the downstream center panel and arranged to lie in spaced-apart relation to one another and lie in a space provided between the two constant-flow oxygen-inlet ports formed in the right border strip and the two constant-flow oxygen-inlet ports formed in the left border strip.

13. The burner of claim 12, wherein the oxygen-flow control valve is supported for rotation about an axis of rotation between an opened position communicating pressurized oxygen from the oxygen-receiving plenum to the primary-oxygen chamber through the oxygen-diversion passageway and the right and left upstream oxygen-admission ports and a closed position blocking flow of pressurized oxygen from the oxygen-receiving plenum to the primary-oxygen chamber through the oxygen-diversion passageway and the right and left upstream oxygen-admission ports and wherein a first of the constant-flow oxygen-inlet ports formed in the right border strip, the four constant-flow oxygen-inlet ports formed in the downstream center panel, and a first of the constant-flow oxygen-inlet ports formed in the left border strip are arranged to extend in series generally along a reference line that is arranged to lie in substantially parallel spaced-apart relation to the axis of rotation of the oxygen-flow control valve.

14. The burner of claim 9, wherein the primary oxygen-supply housing further includes a downstream wall arranged to interconnect the first and second side walls and formed to include the oxygen-discharge outlet and an oxygen-diffuser screen arranged to lie between the downstream constant-flow oxygen-inlet ports and the downstream wall to partition the primary-oxygen chamber into an upstream section communicating with the upstream oxygen-admission ports and the downstream constant-flow oxygen-inlet ports and a downstream section communicating with the oxygen-discharge outlet, the fuel-discharge nozzle is arranged to extend through a nozzle-receiving slot formed in the oxygen-diffuser screen, and the oxygen-diffuser screen is formed to include an array of holes cooperating to define means for diffusing the flow of pressurized primary oxygen passing from the upstream section into the downstream section toward the oxygen-discharge outlet.

15. A burner apparatus for combining oxygen and fuel to produce a combustible mixture that can be ignited to produce a flame, the burner apparatus comprising
an oxygen-receiving plenum adapted to receive pressurized oxygen from an oxygen source,
a fuel supply system including a fuel-discharge nozzle configured to discharge fuel to a first-stage combustion zone associated with the root of a flame, and
an oxygen-supply system including an oxygen conductor including a primary oxygen supply conduit arranged to couple the oxygen-receiving plenum in fluid communication with the first-stage combustion zone to provide primary oxygen to mix with fuel discharged from the fuel-discharge nozzle to produce a combustible mixture that can be ignited to produce the flame and a staged oxygen supply conduit arranged to couple the oxygen-receiving plenum in fluid communication with a second-stage combustion zone arranged to lie in spaced-apart relation to the fuel-discharge nozzle to locate the first-stage combustion zone therebetween and associated with the tip of the flame to provide staged oxygen to mix with fuel associated with the flame to complete combustion of the fuel discharged from the fuel-discharge nozzle, wherein the oxygen conductor further includes field-adjustable control means for varying the ratio of primary oxygen flowing from the oxygen-receiving plenum through the primary oxygen conduit to the first-stage combustion zone associated with the root of the flame to staged oxygen flowing from the oxygen-receiving plenum through the staged oxygen conduit to the second-stage combustion zone associated with the tip of the flame while maintaining at least a minimum flow of pressurized oxygen from the oxygen-receiving plenum as primary oxygen to the first-stage combustion zone,
wherein the field-adjustable control means comprises at least one constant-flow oxygen-inlet orifice provided to communicate pressurized oxygen from the oxygen-receiving plenum to the first-stage combustion zone and a single oxygen-flow control valve mounted for rotation about an axis of rotation between an opened position allowing flow of pressurized oxygen from the oxygen-receiving plenum through an oxygen-diversion passageway to the first-stage combustion zone and a closed position blocking flow of pressurized oxygen from the oxygen-receiving plenum through the oxygen-diversion passageway to the first-stage combustion zone without blocking flow of pressurized oxygen from the oxygen-receiving plenum through the at least one constant-flow oxygen-inlet orifice.

16. The burner apparatus of claim 15, wherein the oxygen-supply system further includes a primary oxygen-supply housing formed to include a primary-oxygen chamber defining a portion of the primary oxygen supply conduit and communicating with the first-stage combustion zone and receiving pressurized oxygen from the oxygen-receiving plenum through the constant-flow oxygen-inlet orifice and, when the single oxygen-flow control valve is rotated to assume the opened position, through the oxygen-diversion passageway and wherein the primary-oxygen supply housing includes a boundary wall located alongside the oxygen-receiving plenum and formed to include the at least one constant-flow oxygen-inlet orifice and a variable-flow oxygen-admission port communicating with the oxygen-diversion passageway and opening into the primary-oxygen chamber.

17. The burner apparatus of claim 15, wherein the oxygen-supply system further includes a primary oxygen-supply housing formed to include a primary-oxygen chamber defining a portion of the primary oxygen-supply conduit and the field-adjustable control means comprises an oxygen-diversion unit coupled to the primary oxygen-supply housing and formed to include an oxygen-diversion passageway connecting the oxygen-receiving plenum in communicating with the primary-oxygen chamber and an oxygen-flow control valve mounted in the oxygen-diversion passageway for movement between an opened position allowing flow of pressurized oxygen from the oxygen-receiving plenum to the primary-oxygen chamber through the oxygen-diversion passageway and a closed position blocking flow of pressurized oxygen from the oxygen-receiving plenum to the primary-oxygen chamber through the oxygen-diversion passageway.

18. The burner apparatus of claim 17, wherein the primary oxygen-supply housing includes a boundary wall separating the primary-oxygen chamber from the oxygen-receiving plenum and wherein the boundary wall is formed to include at least one constant-flow oxygen-inlet orifice communicating with the oxygen-receiving plenum and opening into the primary-oxygen chamber and a variable-flow oxygen-admission port communicating with the oxygen-diversion passageway and opening into the primary-oxygen chamber.

* * * * *